United States Patent
Sasaki et al.

(10) Patent No.: US 6,574,063 B1
(45) Date of Patent: Jun. 3, 2003

(54) CASSETTE CHANGER

(75) Inventors: Kenji Sasaki, Kyoto (JP); Tetsuya Morita, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/582,787

(22) PCT Filed: Dec. 28, 1998

(86) PCT No.: PCT/JP98/06015

§ 371 (c)(1), (2), (4) Date: Jul. 5, 2000

(87) PCT Pub. No.: WO99/35646

PCT Pub. Date: Jul. 15, 1999

(30) Foreign Application Priority Data

| Jan. 9, 1998 | (JP) | 10-003015 |
| Mar. 30, 1998 | (JP) | 10-083379 |
| Sep. 11, 1998 | (JP) | 10-258282 |

(51) Int. Cl.[7] ............................................. G11B 15/18
(52) U.S. Cl. ............................................................ 360/69
(58) Field of Search ............................ 360/69, 92, 94; 369/34, 36, 38, 34.3, 37.2; 318/568; 414/280–281, 277, 786, 797.9; 221/88; 294/119.1, 18

(56) References Cited

U.S. PATENT DOCUMENTS

| 4,164,765 A | * | 8/1979 | Gysling | 360/92 |
| 4,907,889 A | * | 3/1990 | Simone | 360/92 |
| 4,981,409 A | * | 1/1991 | Hirose et al. | 414/223.01 |
| 5,059,772 A | * | 10/1991 | Younglove | 235/383 |
| 5,158,345 A | | 10/1992 | Baur | |
| 5,247,406 A | | 9/1993 | Apple et al. | |
| 5,335,985 A | | 8/1994 | Baur | |
| 5,576,911 A | * | 11/1996 | Porter | 360/92 |
| 5,581,522 A | * | 12/1996 | Sibuya et al. | 235/462.01 |
| 5,622,470 A | * | 4/1997 | Schaefer et al. | 414/275 |
| 5,652,742 A | * | 7/1997 | Baca et al. | 360/98.04 |
| 5,692,623 A | * | 12/1997 | Todor et al. | 206/307.1 |
| 5,757,738 A | * | 5/1998 | Ohba et al. | 312/9.31 |

FOREIGN PATENT DOCUMENTS

| EP | 0 284 445 | 9/1988 |
| EP | 0 392 620 | 10/1990 |
| EP | 0 490 671 A1 | 6/1992 |
| EP | 0 694 917 A2 | 1/1996 |
| JP | 61-182943 | 11/1986 |
| JP | 64-57454 | 3/1989 |
| JP | 2-9058 | 1/1990 |
| JP | 4-10266 | 1/1992 |
| JP | 5-144211 | 6/1993 |
| WO | 95/28708 | 10/1995 |

* cited by examiner

Primary Examiner—David Hudspeth
Assistant Examiner—K. Wong
(74) Attorney, Agent, or Firm—Parkhurst & Wendel, L.L.P.

(57) ABSTRACT

A cassette changer comprises a stocker for storing cassettes, a recording/reproducing device for recording signals in a cassette or reproducing signals from a cassette, and a transfer device for transferring a cassette between the stocker and the recording/reproducing device. The cassette changer further comprises a push-in member for pushing-in a cassette projecting from the stocker to a position where the cassette does not disturb the movement of the transfer device along the cassette in the stocker.

12 Claims, 21 Drawing Sheets

CASSETTE CHANGER

TECHNICAL FIELD

The present invention relates to a cassette changer capable of storing a plurality of tape cassettes for a VCR or the like and sequentially operating these cassettes.

BACKGROUND ART

Cassette changers that store a plurality of cassettes and transfer these cassettes to a recording/reproducing device in an arbitrary order for recording or reproduction are applied to practical use chiefly in broadcasting stations or in computers for data recording. Cassette changers for broadcasting stations are called "cart machines" and are expensive and large enough to each store several hundreds of cassettes. Small-sized cassette changers that each store several cassettes to record data in a computer are also put to practical use.

An example of known cassette changer is described in JP-A-6-20363. This cassette changer will be described below.

This known cassette changer has a recording/reproducing device for recording signals to a cassette including a tape-state recording medium and for reproducing the signals recorded in the cassette. A turntable is provided above the recording/reproducing device and can be rotated through 180 degrees around a rotating shaft extending in a vertical direction of the turntable. A first stocker and a second stocker are disposed for rotation integral with the turntable and at 180 degrees from each other with respect to the rotating shaft of the turntable. Each of the stockers can store a plurality of cassettes in the vertical direction.

A transfer device is provided which can move between the recording/reproducing device and the stockers in the vertical direction. This transfer device can transfer cassettes between the recording/reproducing device and one of the stockers which is located correspondently to the transfer device by means of rotation of the turntable. Specifically, the transfer device picks up one of the cassettes stored in the stocker, withdraws it thereinto, moves downward with the cassette held therein so as to face an insertion and withdrawal opening in the recording/reproducing device, and ejects the held cassette to the insertion and withdrawal port.

On the contrary, the transfer device can remove a cassette from the insertion and withdrawal opening of the recording/reproducing device, and then transfer it to the stocker.

In this manner, basic operations of cassette changers are performed, that is, an arbitrary cassette accommodated in one of the stockers is transferred to the recording/reproducing device and a cassette for which recording or reproduction has been completed is transferred to a desired position in one of the stockers.

In this known cassette changer, however, upon external vibration or impact after installation, a cassette stored in the first or second stocker may shift from its specified storing positions. In this case, when the transfer device moves in the vertical direction, there is a problem that this transfer device may disadvantageously interfere with the shifted cassette to cause malfunction. Additionally, during the rotation of the turntable, the rotational trace of the cassette is extended due to the shift, so that another member of the cassette changer such as a casing or the like of the device interferes with the cassette to cause malfunction.

DISCLOSURE OF THE INVENTION

It is an object of the present invention to provide a cassette changer prevents malfunction resulting from an offset of a cassette from its specified storing position in a stocker by means of a simple configuration.

To attain this object, a cassette changer according to the present invention comprises:

- a stocker for storing a plurality of cassettes along a vertical direction of the cassette changer;
- a recording/reproducing device for recording signals in the cassettes or reproducing signals from the cassettes;
- a transfer device for transferring the cassettes between the stocker and the recording/reproducing device; and
- a push-in member operating in response to movement of the transfer device in the vertical direction along the device in the stocker.

According to the present invention, even when the cassette changer is subjected to external vibration or impact to cause a cassette stored in the stocker to shift and project from its specified storing position to a position where the cassette disturbs the movement of the transfer device, the push-in member can push the cassette into the stocker in response to a moving operation of the transfer device, which is one of the basic operations of the cassette changer. Consequently, required mechanisms can be simplified, and malfunction can be prevented, that is, the cassette is prevented from disturbing the movement of the transfer device.

EMBODIMENTS OF THE INVENTION

Figure 1:
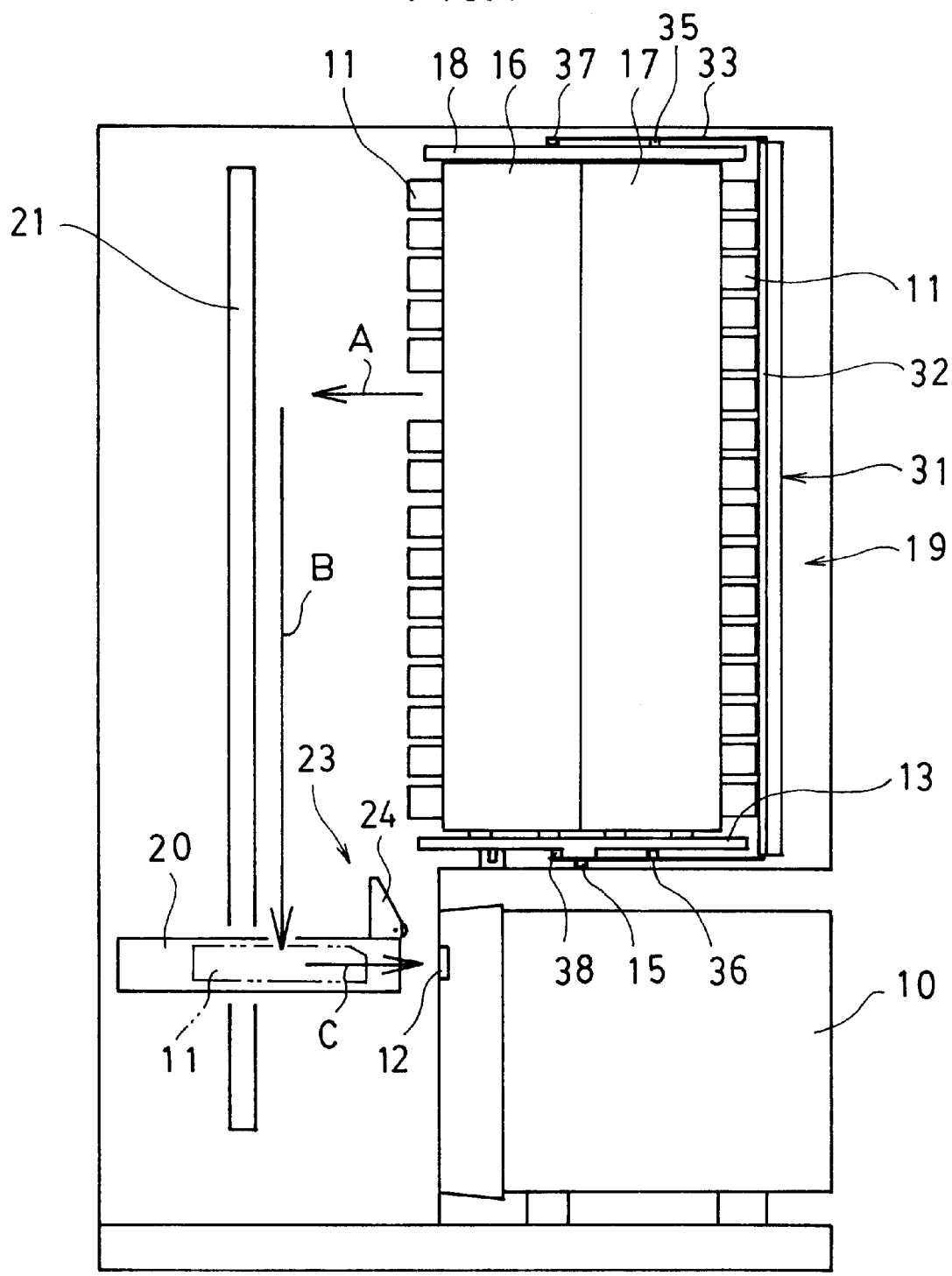
FIG. 1 is a front view showing a general configuration of a cassette changer according to an embodiment of the present invention.

In a cassette changer shown in FIG. 1, reference numeral 10 denotes a recording/reproducing device for recording signals in a cassette 11 and reproducing signals from the cassette 11. The recording/reproducing device 10 has an insertion and withdrawal opening 12 in a front surface thereof. The insertion and withdrawal opening 12 is used to insert and withdraw the cassette 11 into and from the recording/reproducing device 10.

Figure 2:
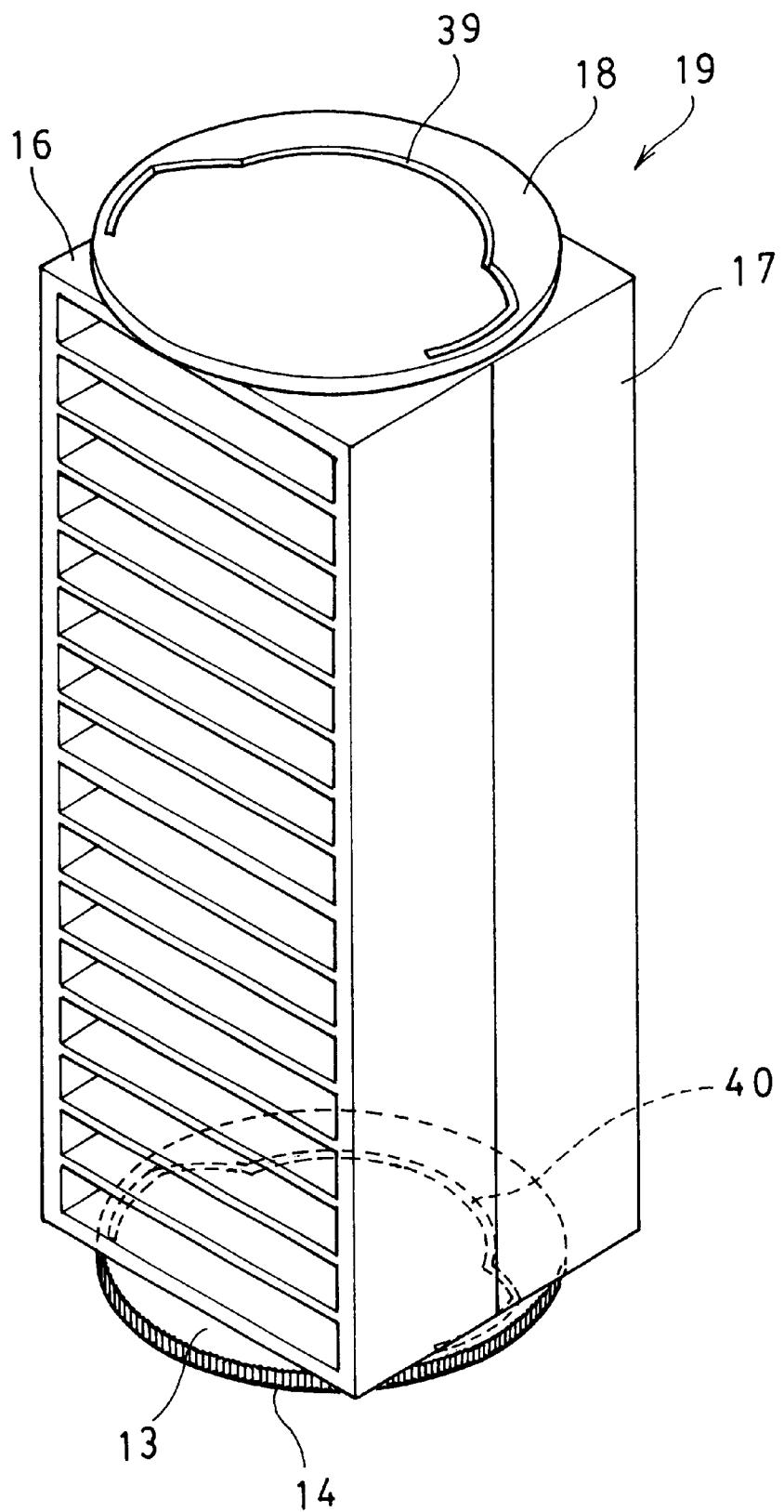
FIG. 2 is a perspective view of a rotation unit shown in FIG. 1.
Figure 3:
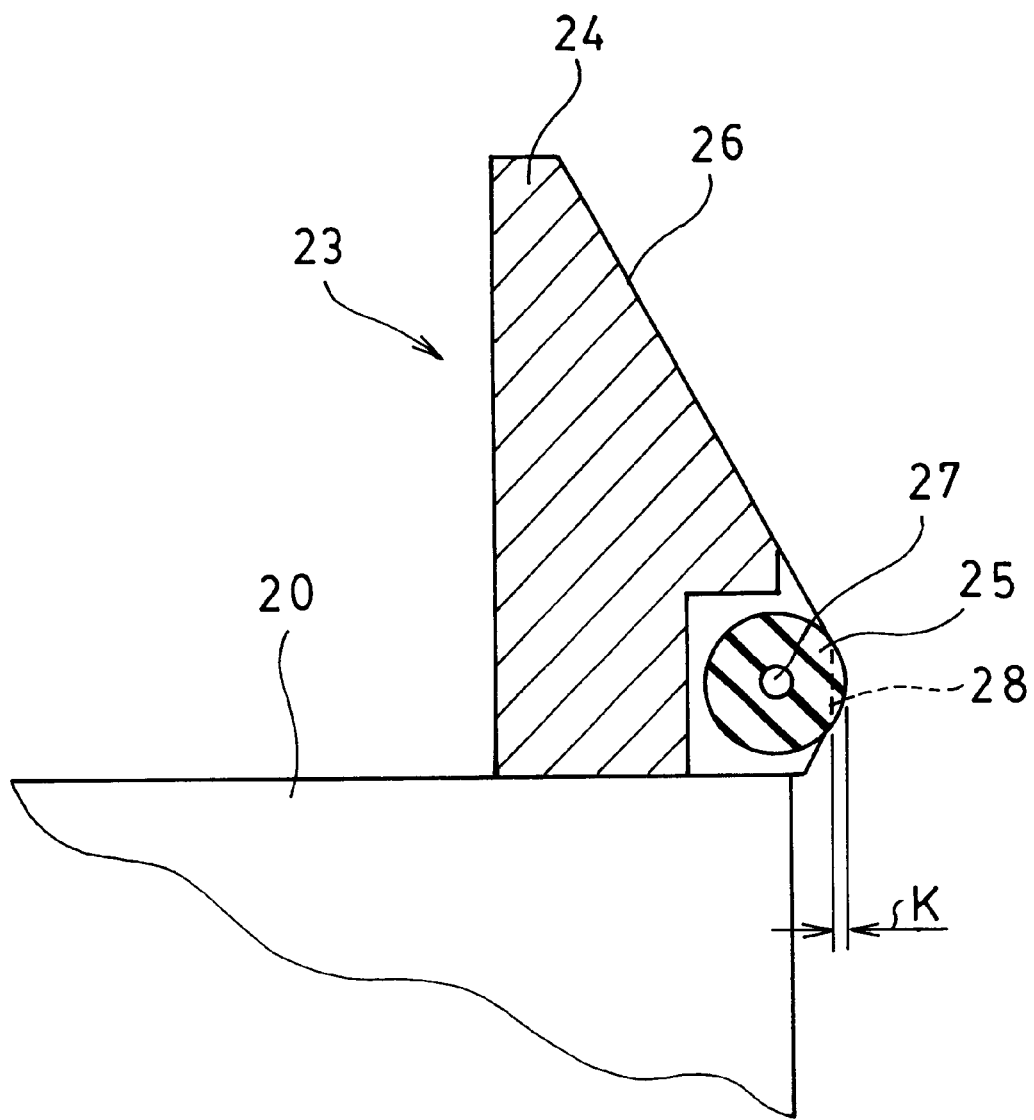
FIG. 3 is an enlarged sectional view of a push-in member in FIG. 1.

A turntable 13 is provided above the recording/reproducing device 10. Since the turntable 13, as shown in FIG. 2 has a gear 14 formed in an outer peripheral portion thereof, it can be rotated around a rotating shaft 15 through 180 degrees by means of a rotative-drive mechanism, described later. A first stocker 16 and a second stocker 17 are disposed back to back on the turntable 13, that is, at 180 degrees from each other with respect to the rotating shaft 15. The first stocker 16 and the second stocker 17 are configured to store sixteen cassettes 11 in lamination along a vertical direction. As shown in FIG. 1, each of the cassettes 11 is stored in the stocker 16, 17 in a manner such that its end projects from the stocker 16, 17. A disc-shaped upper cam 18 is mounted on top surfaces of the first and second stockers 16, 17. A rotation unit 19 comprises the turntable 13, the first stocker 16, the second stocker 17 and the upper cam 18.

In FIG. 1, the first stocker 16 is located at a front position corresponding to the insertion and withdrawal opening 12 of the recording/reproducing device 10 and the second stocker 17 is located at a rear position opposite the front position.

A transfer device 20 is disposed to elevate and lower along a rack 21 in the vertical direction, for transferring the cassette 11 between the stocker located at the front position and the recording/reproducing device 10. The transfer device 20 has a vertical-drive device (not shown in FIG. 1) including a pinion that meshes with the rack 21 to move the transfer device 20 in the vertical direction, and a horizontal-drive device (not shown) for withdrawing the cassette 11 into the transfer device 20 from the stocker 16, 17 or the insertion and withdrawal opening 12 of the recording/reproducing device 10 and ejecting the cassette 11 in the transfer device 20 to the stocker 16, 17 or the insertion and withdrawal opening 12 of the recording/reproducing device 10.

As shown in FIGS. 1 and 3 to 6, the transfer device 20 has a push-in member 23 on a top surface of a central portion thereof. The push-in member 23 has a cam 24 and an elastic roller 25. The cam 24 has a cam surface 26 inclined so that the cam surface 26 is linearly closer to the cassettes 11 in the stocker 16, 17 from highest position to lowest position. The elastic roller 25 is formed of an elastic member, for example, rubber and rotatably supported by a roller shaft 27 extending in a horizontal direction. The elastic roller 25 projects forward from a tip portion 28 of the cam surface 26 by a distance K.

As shown in FIGS. 1 and 6 to 10, the cassette changer has a cassette presser 31. The cassette presser 31 has a vertical presser section 32 and horizontal arms 33, 34 extending from an upper and a lower ends of the presser section 32, the vertical presser section 32 and the horizontal arms 33, 34 being integrated with one another. The arms 33, 34 centrally have shafts 35, 36, respectively, extending along the same vertical axis so that the cassette presser 32 can pivot in the horizontal direction around the shafts 35, 36. The arms 33, 34 each have a cam follower pin 37, 38, respectively, at a tip thereof.

The upper cam 18 has a cam groove 39 formed therein and in which the upper cam follower pin 37 is fitted from upside. As shown in FIG. 2, the turntable 13 has a cam groove 40 formed therein and in which the lower cam follower pin 38 is fitted from downside.

Figure 6:
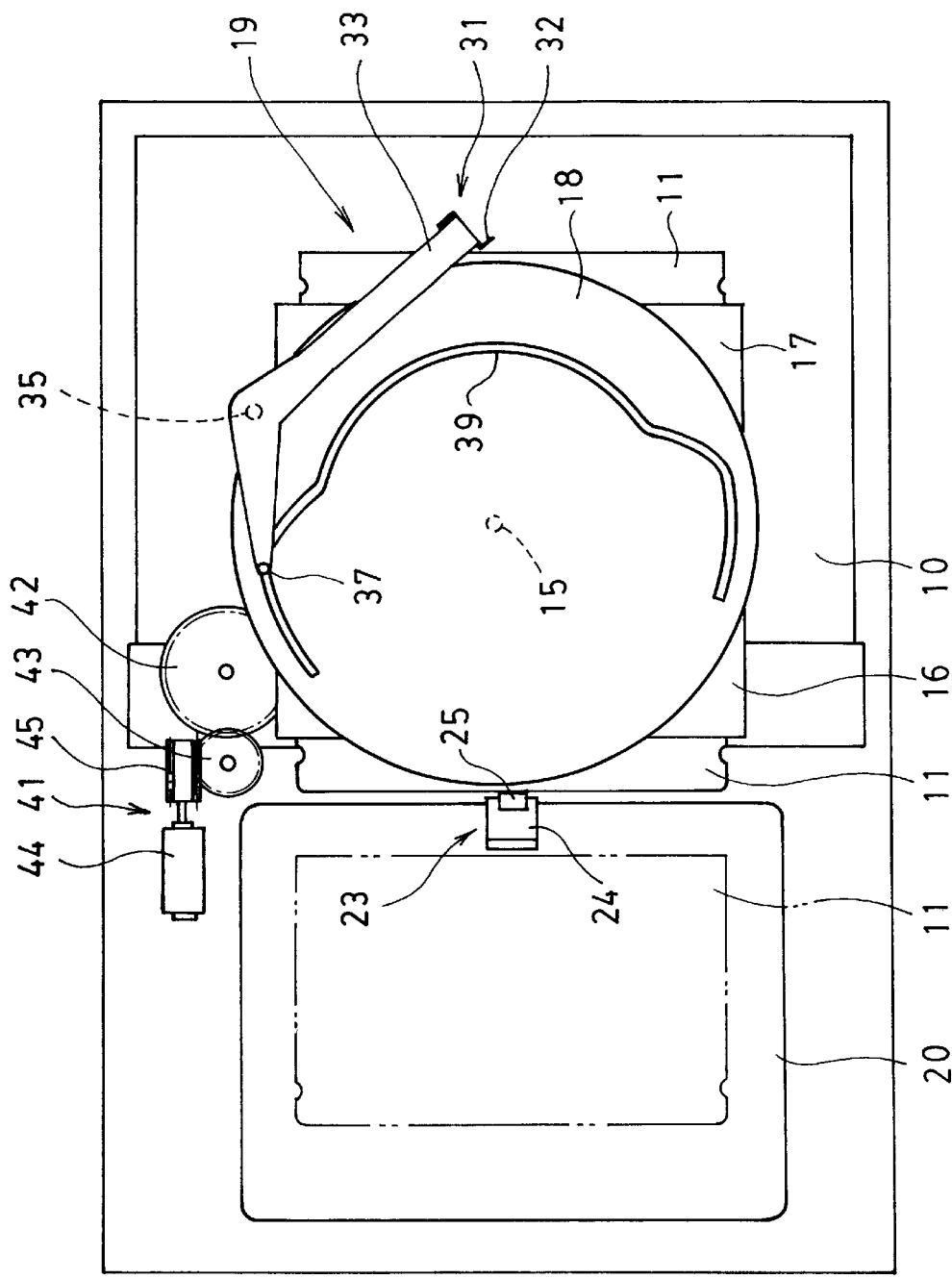
FIG. 6 is a top view of the cassette changer in FIG. 1.
Figure 7:
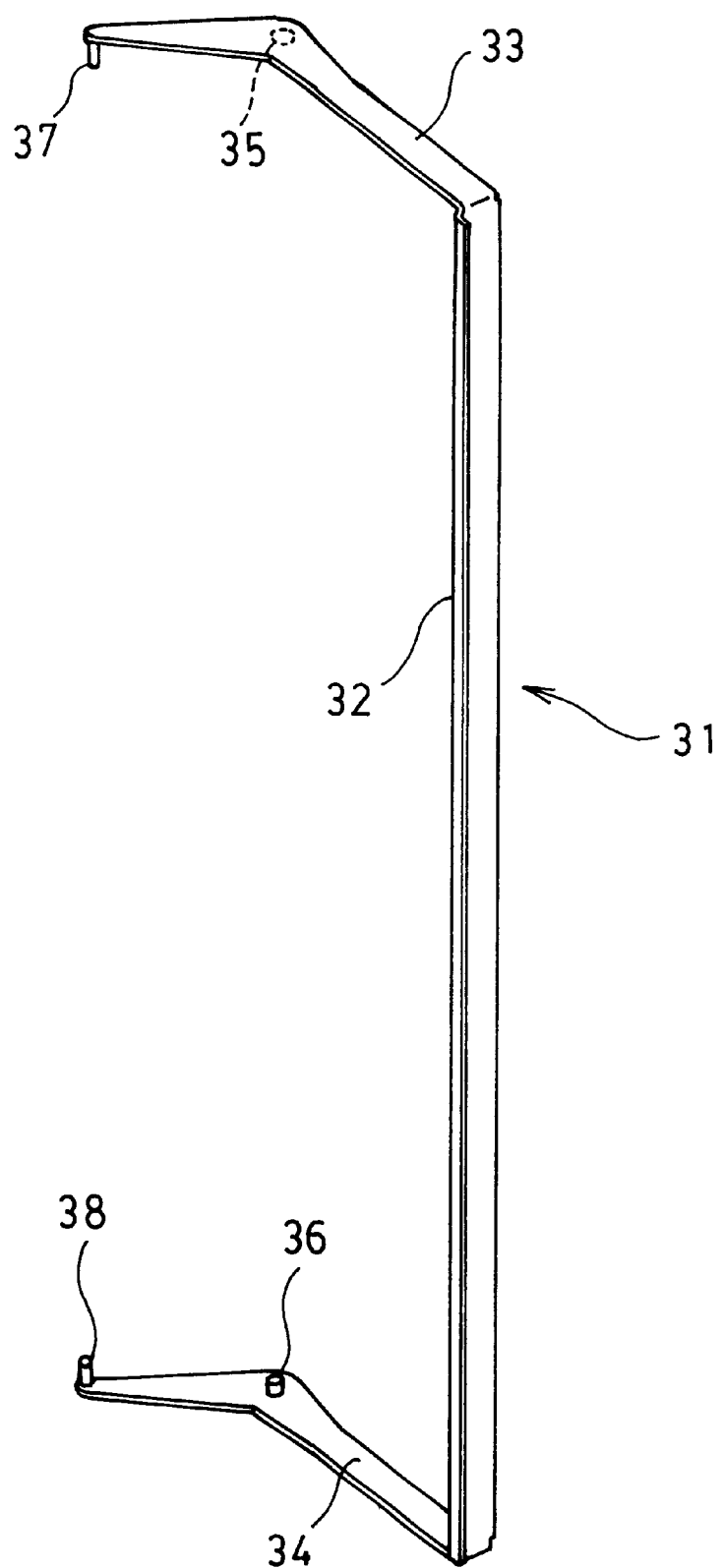
FIG. 7 is a perspective view of a cassette presser shown in FIG. 1.

As shown in FIG. 6, a rotative-drive mechanism 41 for rotating the turntable 13 comprises a relay gear 42 that meshes with the gear 14 of the turntable 13 shown in FIG. 2, a second relay gear 43 for rotating the first relay gear 42, and a worm 45 rotated by a motor 44 to drive a worm wheel (not shown) that integrally rotates with the second relay gear 43.

With this configuration, if the first stoker 16 is located at a front position corresponding to the insertion and withdrawal opening 12 of the recording/reproducing device 10 as shown in FIG. 1, the cassette 11 stored in the sixth stage from the top of the first stocker 16 is transferred to the recording/reproducing device 10 as follows:

First, the transfer device 20 moves along the rack 21 up to the height at which this cassette 11 is stored, and then withdraws the cassette 11 thereinto. Next, with the cassette 11 that is withdrawn inside, the transfer device 20 lowers down to the insertion and withdrawal opening 12 of the recording/reproducing device 10. The transfer device 20 then ejects the cassette 11 that is withdrawn inside, to the insertion and withdrawal opening 12. This operation causes the cassette 11 to be fed into the recording/reproducing device 10 from the insertion and withdrawal opening 12 for recording or reproduction. A movement path followed by the cassette 11 is shown by references A, B, and C in FIG. 1.

An operation of returning the cassette 11 inside the recording and reproducing device 10 to the first stocker 16 is reverse to the one described above.

On the contrary, if the desired cassette 11 is stored in the second stocker 17 located at a rear position in FIG. 1, then before the above described operation, the rotation unit 19 is rotated by the rotative-drive mechanism 41 to move the second stocker 17 forward.

In this manner, a basic operation is performed which transfers the arbitrary cassette 11 stored in the first or second stocker 16 or 17 to the recording/reproducing device 10 for recording or reproduction.

Figure 4:
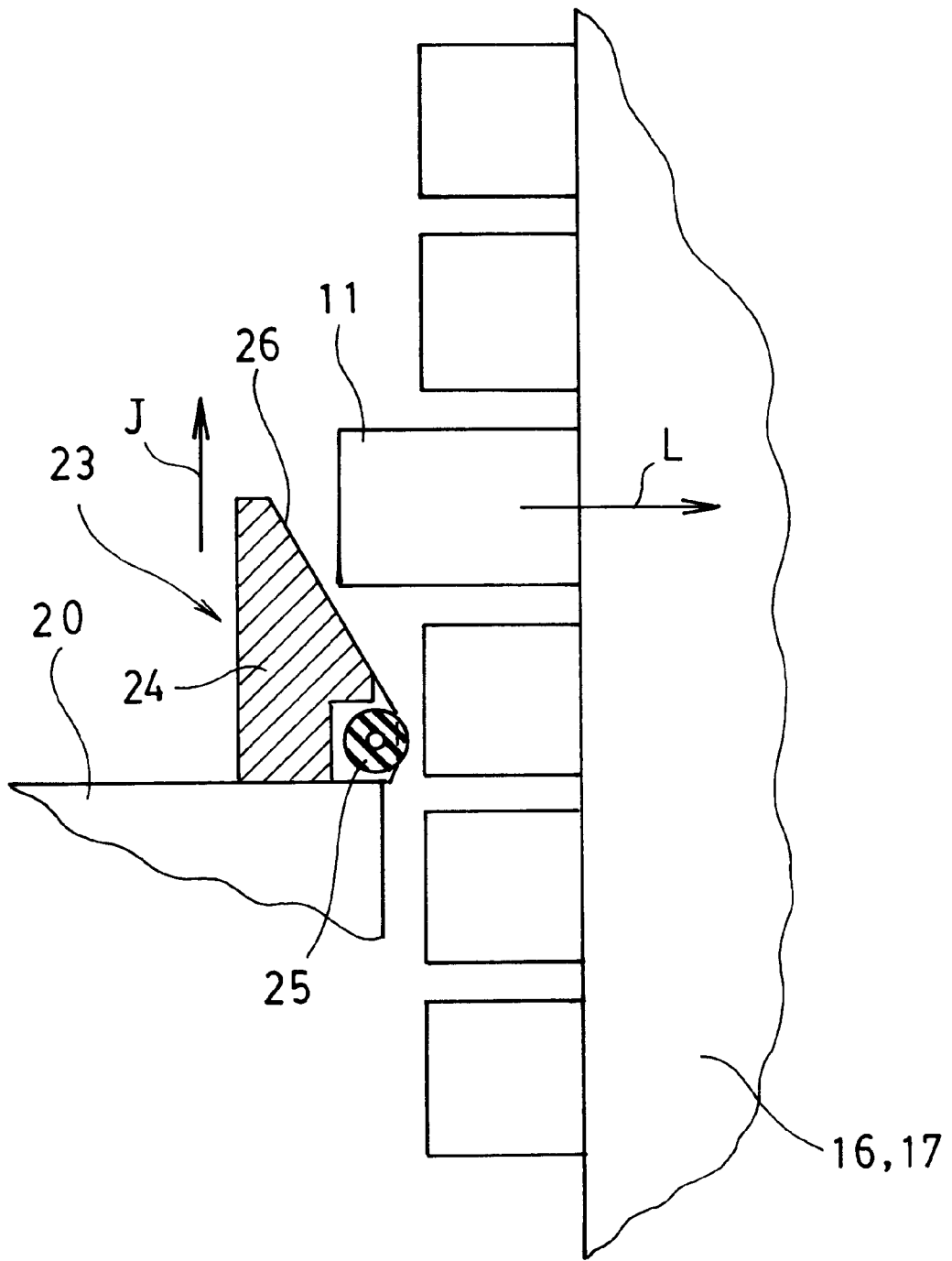
FIG. 4 is a diagram showing an operation of the push-in member.
Figure 5:
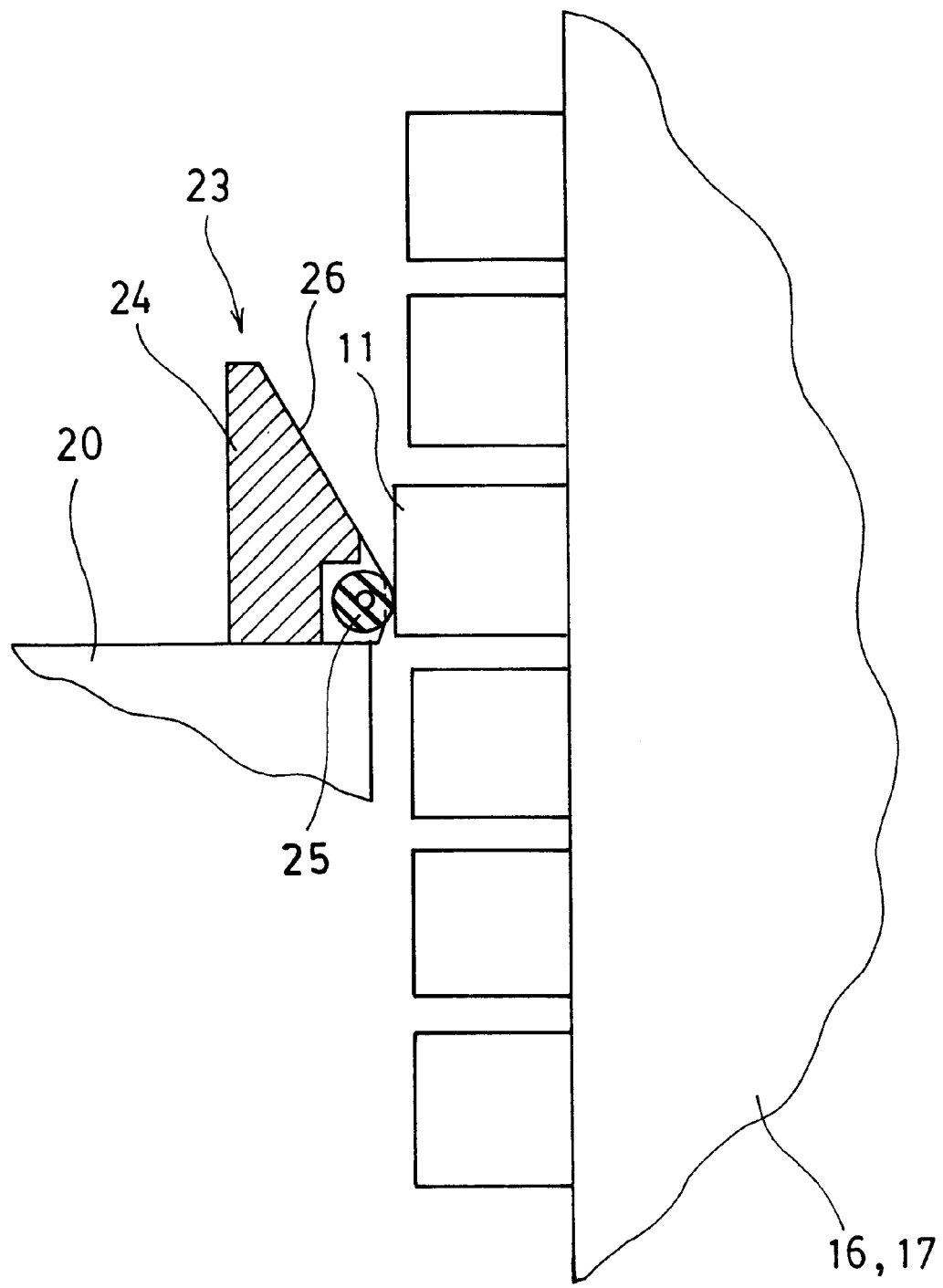
FIG. 5 is a diagram showing an operation subsequent to that shown in FIG. 4.

Next, it is assumed that the cassette changer is subjected to external vibration or impact to cause the cassette 11 stored in the first or second stocker 16 or 17 to shift and project from its specified storing position as shown in FIG. 4. In this state, for example, to transfer a cassette stored above the projecting cassette 11 to the recording/reproducing device 10, the following operation is performed after the transfer device 20 has passed by the projecting cassette 11:

When the transfer device 20 moves in a direction J from the position shown in FIG. 4, the cassette 11 is pushed by the cam surface 26 of the cam 24 of the push-in member 23 and by the elastic roller 25, to move in, a direction L in which it advances into the stocker 16, 17. FIG. 5 shows that the cassette 11 has been pushed into the stocker 16, 17 so as not to disturb the movement of the transfer device 20. Thus, even if the cassette 11 projects and shifts from the specified storing position to a position where it obstructs the movement of the transfer device 20, it can be pushed into the stocker 16, 17 in response to the movement of the transfer device 20, which is a basic operation of the cassette changer. Consequently, required mechanisms can be simplified, and malfunction can be prevented, that is, the cassette 11 is prevented from disturbing the movement of the transfer device 20.

The transfer device 20, which has passed by the projecting cassette 11, moves in a direction opposite to the direction J while having the desired cassette withdrawn to its interior, and passes by the previously projecting cassette 11 again. At this point, the elastic roller 25 comes in contact with the cassette 11, noise is prevented during the contact because the elastic roller 25 is formed of an elastomer. Further, since the elastic roller 25 rotates while moving in contact with the cassette 11, moving loads on the transfer device 20 are reduced during the contact.

Figure 8:
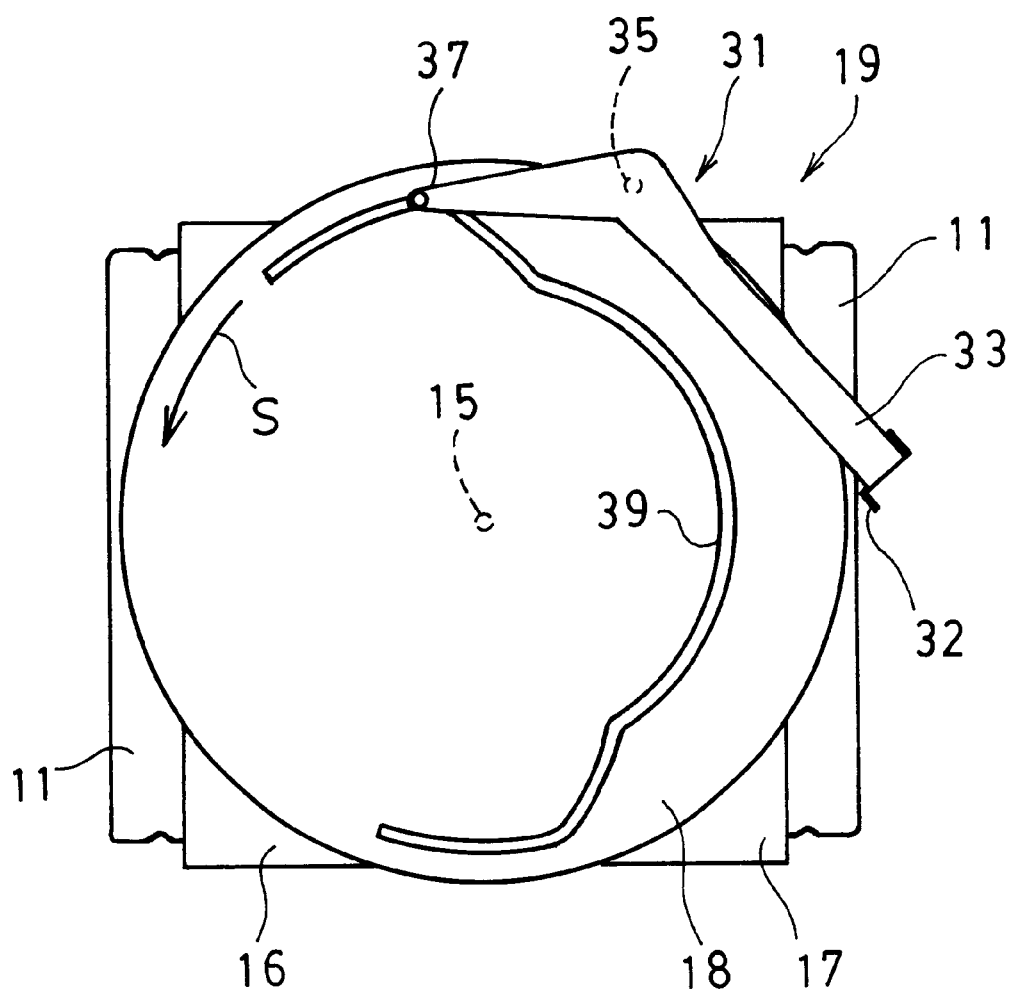
FIG. 8 is a top view for describing an operation of the cassette presser in FIG. 7.

In FIG. 8, the rotation unit 19 is stopped in a position where the first stocker 16 is opposed to the transfer device 20. In this state, the cassette presser 31 prevents the cassettes 11 stored in the second stocker 17 from projecting from their specified positions because the presser section 32 pushes all the cassettes 11 stored in the second stocker 17 by following the shape of the cam groove 39, 49 in which the cam follower pin 37, 38 is fitted.

If, in the state shown in FIG. 8, the rotation unit 19 is rotated around the rotating shaft 15 through 180 degrees in a direction S by means of the rotative-drive mechanism 41 shown in FIG. 6, the cam grooves 39, 40 also rotate integrally. Then, the cam follower pins 37, 38 move along the cam grooves 39, 40, respectively, consequently the cassette presser 31 rotates around the shafts 35, 36, and as shown in FIG. 9, the presser section 32 leaves the cassettes 11.

Figure 9:
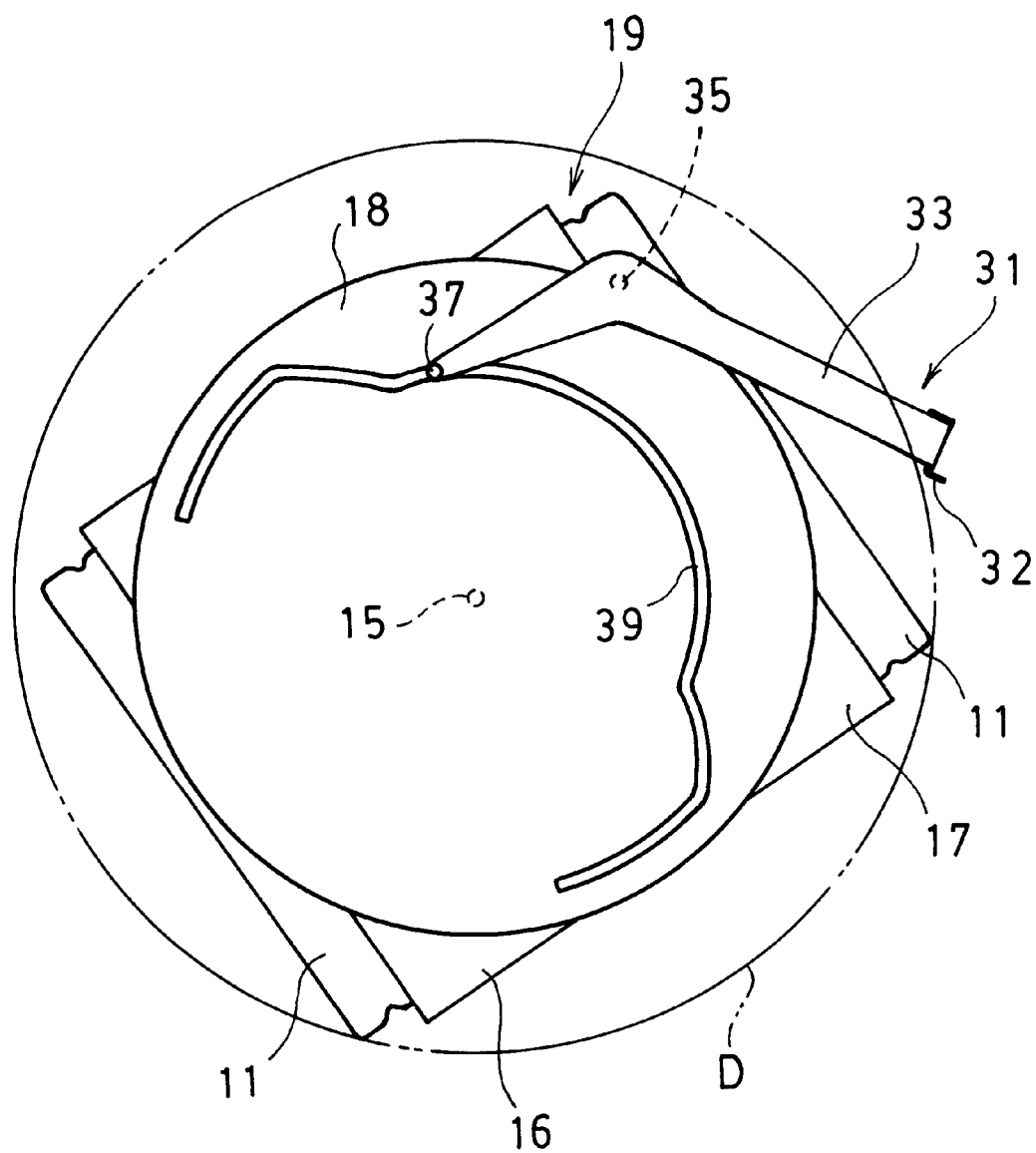
FIG. 9 is a diagram showing an operation subsequent to that shown in FIG. 8.

In FIG. 9, a circle D represents an outermost rotational trace of the cassettes 11 stored in the first stocker 16 and the second stocker 17. The presser section 32 of the cassette presser 31 is located outside the circle D and thus does not hinder the rotative movement of the rotation unit 19.

Figure 10:
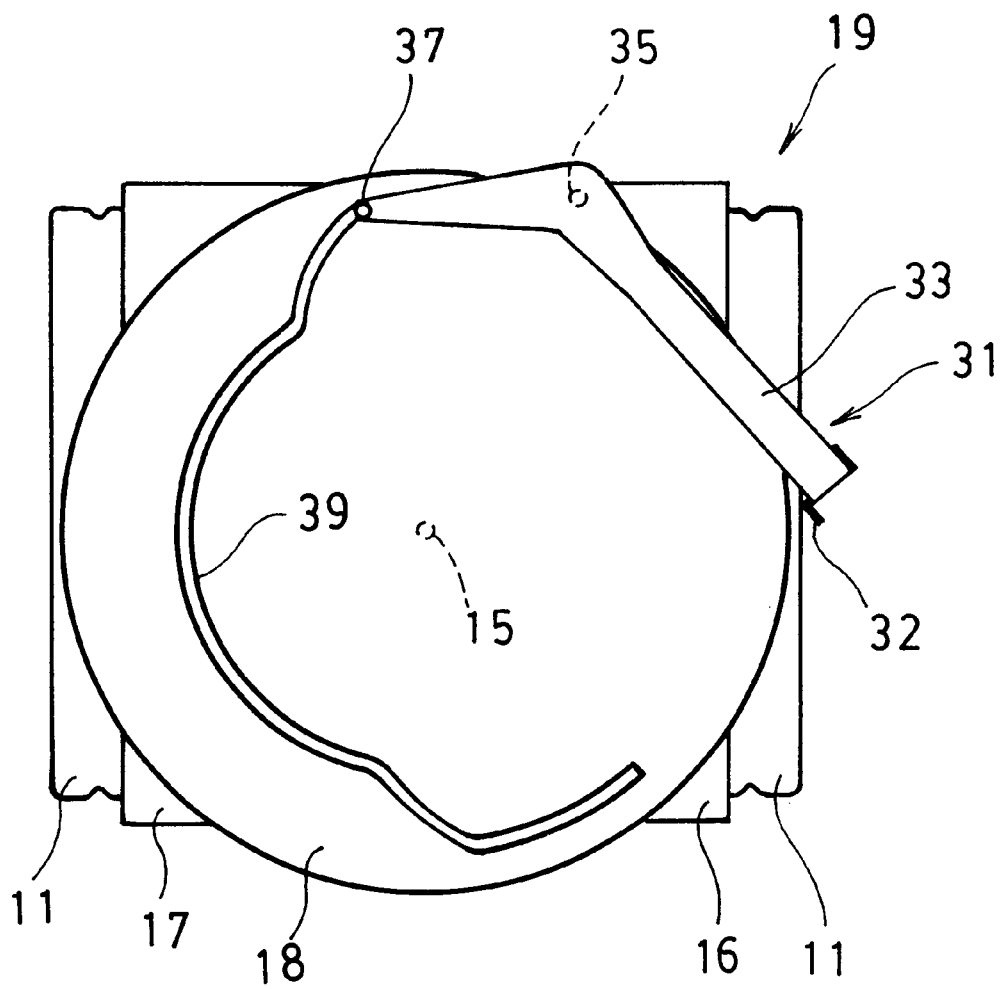
FIG. 10 is a diagram showing an operation subsequent to that shown in FIG. 9.

FIG. 10 shows that the rotation unit 19 is further rotated from the state shown in FIG. 9, that is, through 180 degrees from the state shown in FIG. 8. In this case, the cam follower pin 37, 38 fitted in the cam groove 39, 40, respectively, moves to rotate the cassette presser 31 around the shaft 35, 36 to allow the presser section 32 to push into the first stocker 16 located at the rear position, the all the cassettes 11 stored therein. Thus, all the cassettes 11 stored in the first stocker 16 are precluded from, projecting from their specified positions.

As described above, the cassette presser 31 prevents the cassettes 11 in the first or second stocker 16 or 17 located at the rear position from protruding from their specified storing positions while the rotation unit 19 is stopped. In addition, while the rotation unit 19 is rotating, the cassette presser 31 moves to a position where it does not hinder the movement of the rotation unit 19. As described above, the upper cam 18 and the turntable 13 which is located on the lower side, have the cam grooves 39, 40, respectively, formed therein, and the cam follower pins 37, 38 perform the same operation both on the upper and lower sides. This configuration prevents the cassette presser 31, which is elongated in the vertical direction, from being twisted.

In the illustrated cassette changer, the cassette presser 31 is moved using power associated with the rotation of the rotation unit 19. This eliminates the needs for a new drive mechanism to simplify the mechanisms. The present invention, however, is not limited to this, but another drive mechanism can be employed.

Next, the configuration of miniaturizing a cassette changer according to the present invention will be described.

Figure 11:
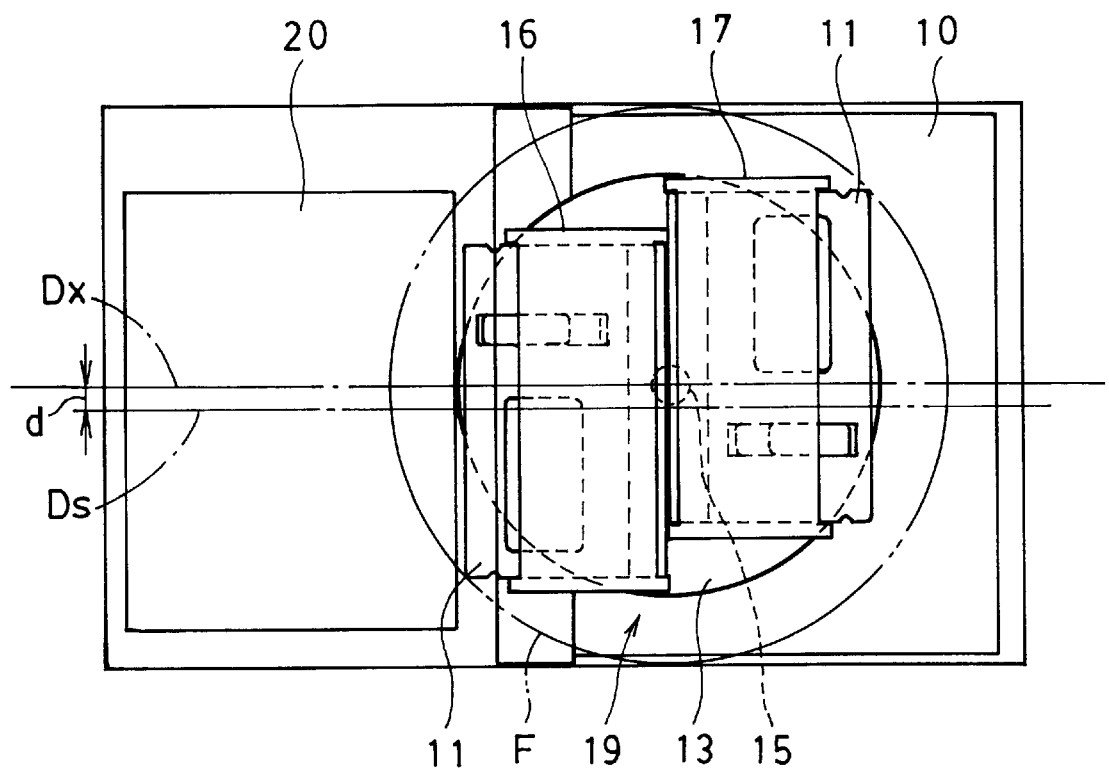
FIG. 11 a top view showing a general configuration of a cassette changer according to another embodiment of the present invention.
Figure 12:
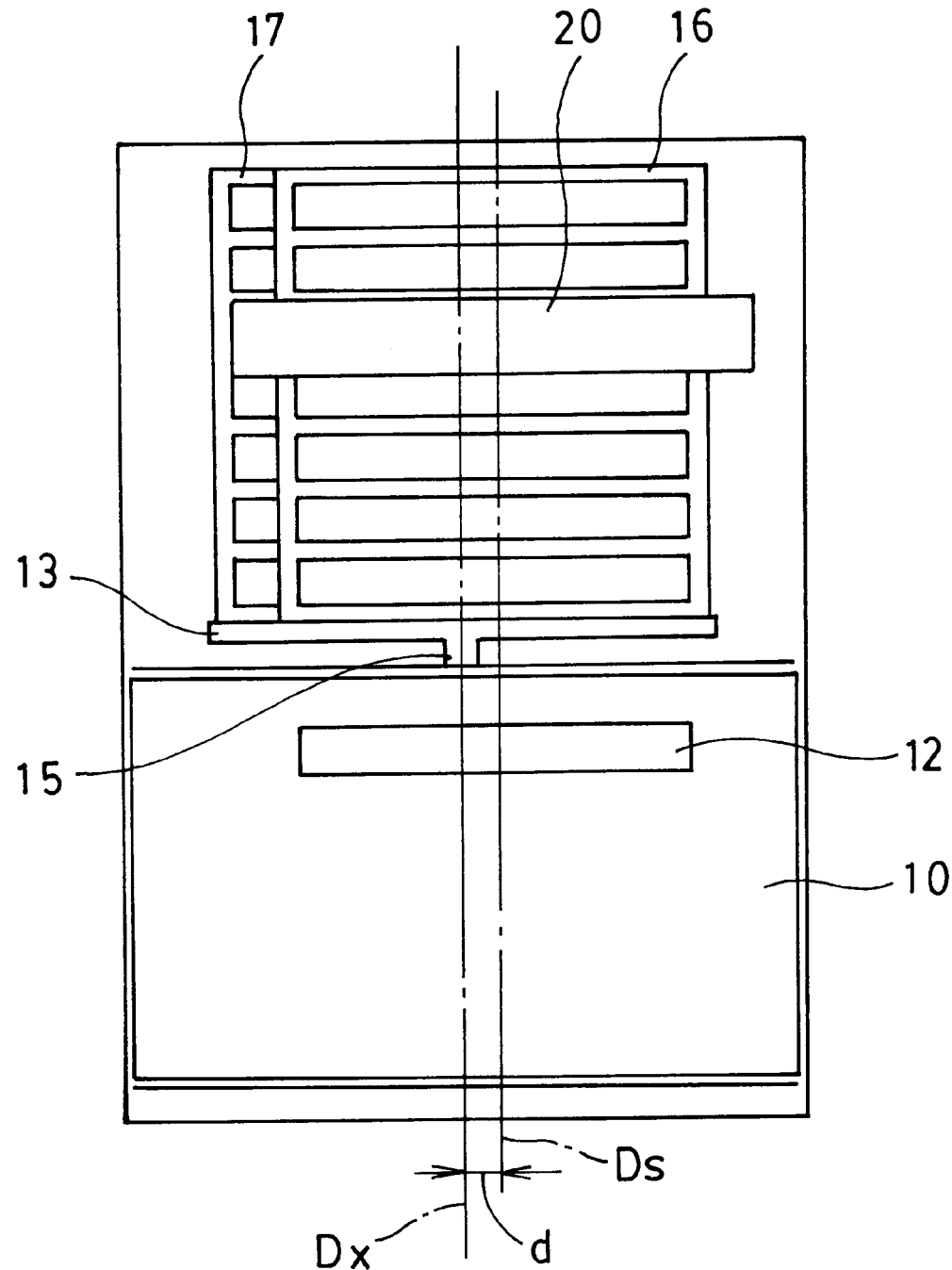
FIG. 12 is a side view of the cassette changer shown in FIG. 11.

In the cassette changer shown in FIGS. 11 and 12, the insertion and withdrawal opening 12 of the recording/reproducing device 10 is biased in a lateral direction of the cassette changer. A straight line Dx is a center line in a width direction of the recording/reproducing device 10. A straight line Ds passes through a central point of the insertion and withdrawal opening 12 in the width direction, and is parallel with the straight line Dx and separate therefrom by a distance d.

Figure 13:
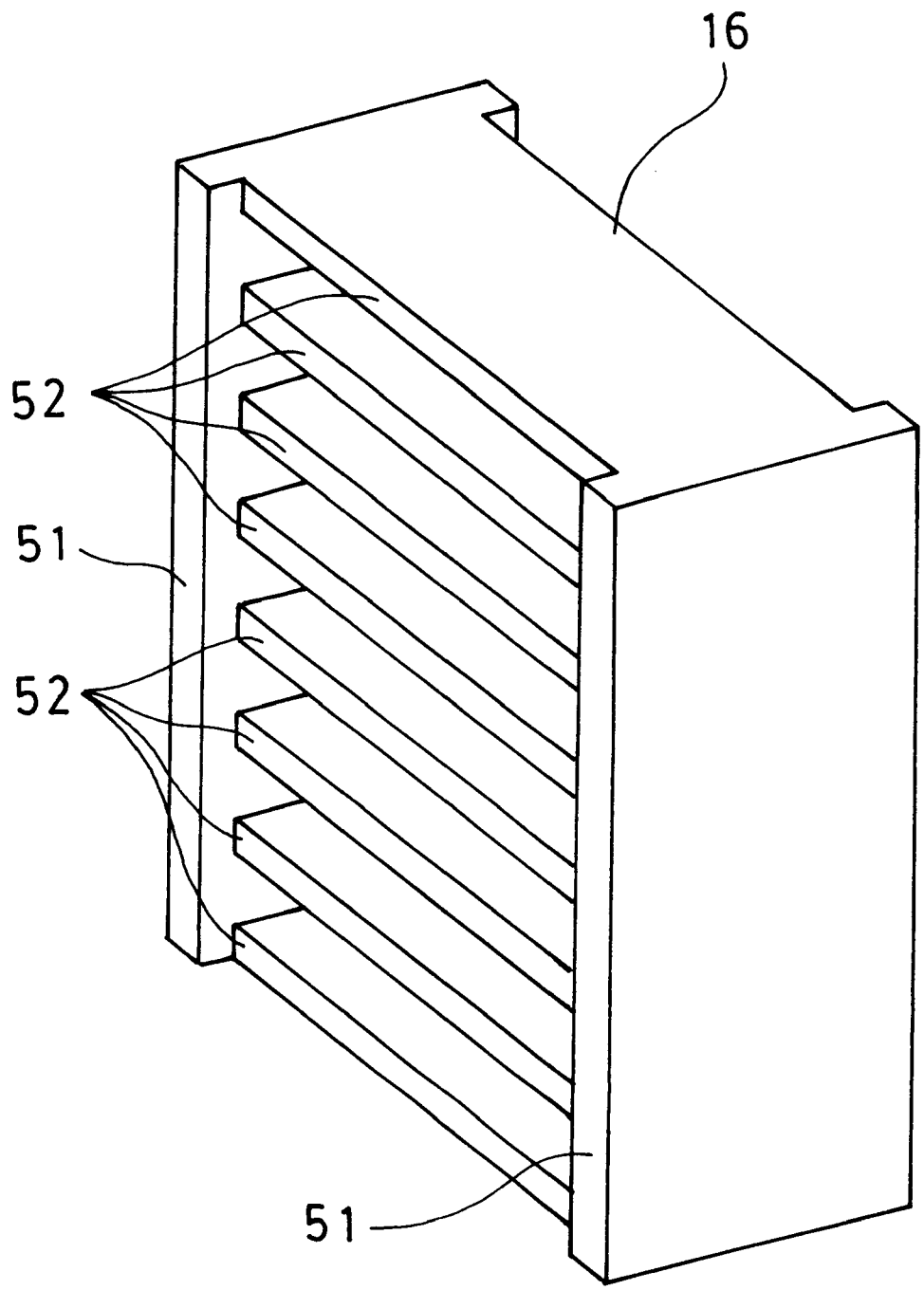
FIG. 13 is a perspective view of a stocker shown in FIGS. 11 and 12.

In the cassette changer according to the embodiment shown in FIGS. 11 and 12, the first stocker 16 and the second stocker 17 are configured to store seven cassettes along the vertical direction as shown in FIG. 13. The first stocker 16 shown in FIG. 13 has two side walls 51, 51 for regulating the width direction of the tape cassettes 11 and eight partitioning plates for regulating a thickness direction of tape cassettes 11 and has seven storing shelves. The side walls 51 project forward from the partitioning plates 52. The second stocker 17 has a similar configuration.

A central point of the rotating shaft 15 of the turntable 13 is located on the straight line Dx, which is the center line of the recording/reproducing device 10 in the width direction. The first stocker 16 is located on the turntable 13 at a position where when the turntable 13 rotates until the stocker 16 is opposed to the transfer device 20, the width-wise central point of the tape cassettes 11 stored in this stocker 16 rests on the straight line Ds, which passes through the central point of the insertion and withdrawal opening 12 in the width direction. The second stocker 17 is similarly located where it is opposed to the transfer device 20, the width-wise central point of the tape cassettes 11 stored in this stocker 17 rests on the straight line Ds. In other words, the first stocker 16 and the second stocker 17 are located on the turntable 13 and offset from each other in the width direction.

The transfer device 20 is similarly located so as to have its width-wise center on the straight line Ds in order to withdraw the tape cassettes 11 having their central point on the straight line Ds and to eject these cassettes 11 to the first stocker and the second stocker.

Figure 14:
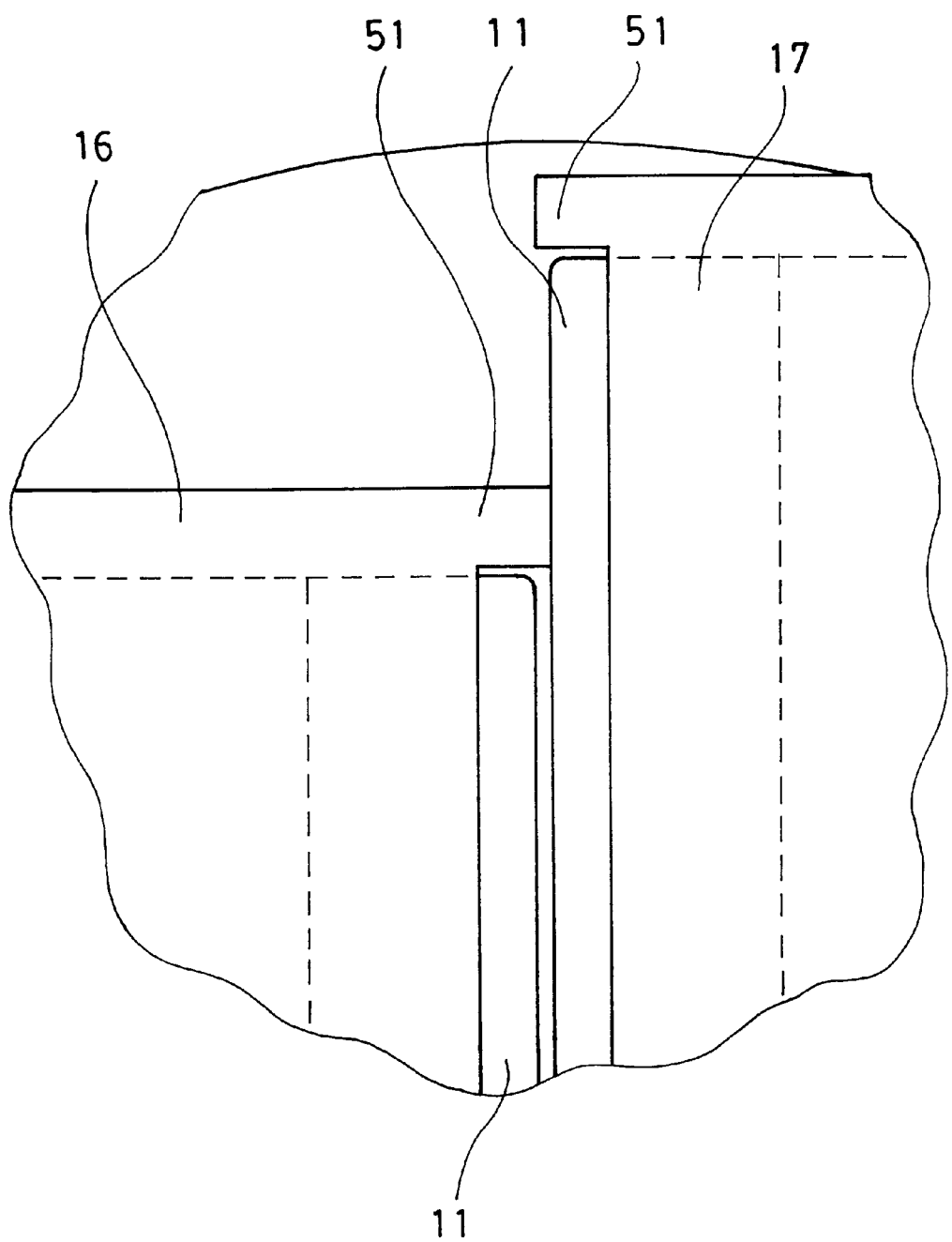
FIG. 14 is an enlarged view of an essential part of FIG. 11.

The first stocker 16 and the second stocker 17, which are located on the turntable 13 as described above, are configured so that the side walls 51 of the second stocker 17 regulate the depth of the tape cassettes 11 stored in the first stocker 16 as shown in FIG. 14, whereas the side walls 51 of the first stocker 16 regulate the depth direction of the tape cassettes 11 stored in the second stocker 17.

Figure 16:
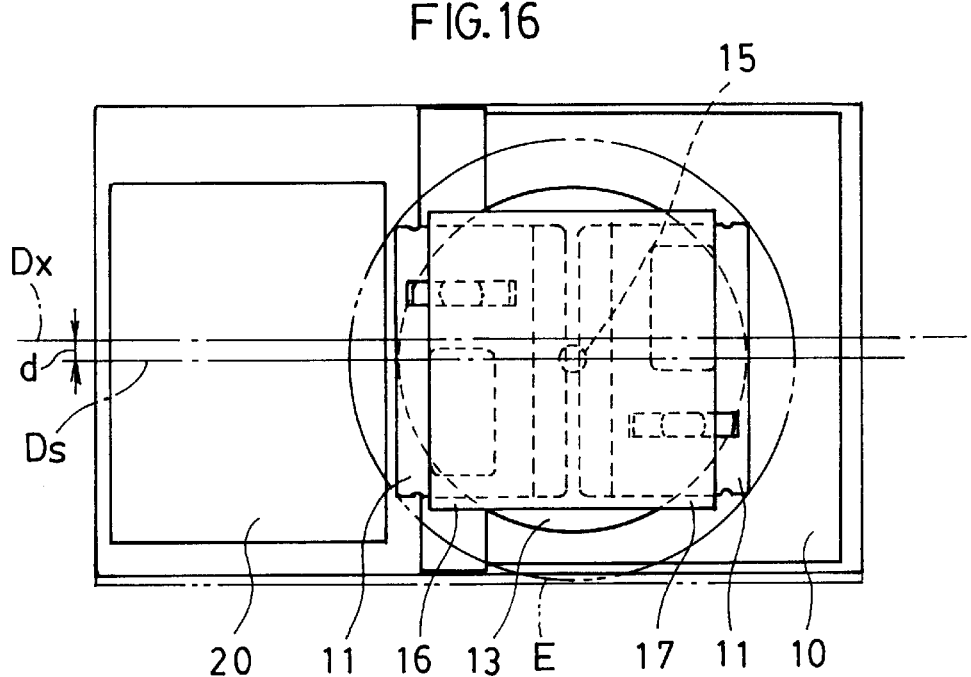
FIG. 16 is a top view of a disadvantageous cassette changer without the configuration shown in FIGS. 11 to 14 according to the present invention.
Figure 17:
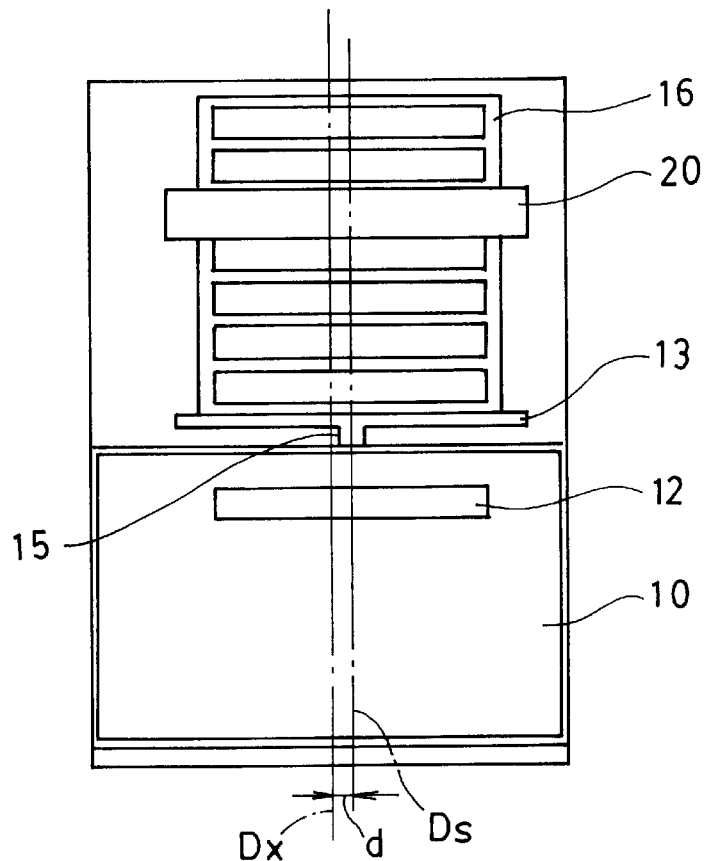
FIG. 17 is a side view of the cassette changer in FIG. 16.

The cassette changer configured as described above has reduced dimensions in its width direction. FIGS. 16 and 17 shows another cassette changer without the configuration of the present invention to explain the advantages of the cassette changer according to the present invention. The cassette changer in FIGS. 16 and 17 differs from the cassette changer according to the present invention shown in FIGS. 11 to 14 in terms of the configuration and arrangement of the stockers.

In the cassette changer shown in FIGS. 16 and 17, the first stocker 16 and the second stocker 17 are not located offset from each other in the width direction as in the cassette changer according to the present invention, but the first stocker 16 and the second stocker 17 share the same center line, that is, the center line of the cassettes 11 stored in the first stocker 16 is the same as that of the cassettes 11 stored in the second stocker 17. This center line is located on the straight line Dc correspondently to the eccentrically disposed insertion and withdrawal opening 12. Additionally, the central point of the rotating shaft 15 of the turntable 13 is located on the straight line Ds, which is separate from the straight line Dx by the distance d, wherein the straight line Dx is the center line of the recording/reproducing device 10.

In the cassette changer configured as described above and shown in FIGS. 16 and 17, the cassette 11 rotates in such a manner as to trace a circle E during the rotation of the turntable 13. As shown in FIG. 16, the circle E protrudes out from a specified width of the recording/reproducing device 10. Thus, the cassette changer must be enlarged in the width direction in order to cover this protruding portion.

In the cassette changer according to the present invention, however, the width-wise central point of the cassettes 11 in, for example, the first stocker 16, which is located in front of the transfer device 20, is located on the straight line Ds, which is separate from the straight line Dx by the distance d, as described above, and the width-wise central point of the tape cassettes 1,1 in the opposite second stocker 17 is located separately from the straight line Dx toward the opposite side of the straight line Ds by the distance d. In addition, the central point of the rotating shaft 15 of the turntable 13 is disposed on the straight line Dx. In this configuration, when the turntable 13 rotates through 180 degrees, the center line of the cassettes 11 moved to the front of the transfer device 20 rests on the straight line Ds. In the cassette changer configured as described above, the cassettes 11 rotates in a fashion tracing a circle F, shown in FIG. 11.

Figure 15:
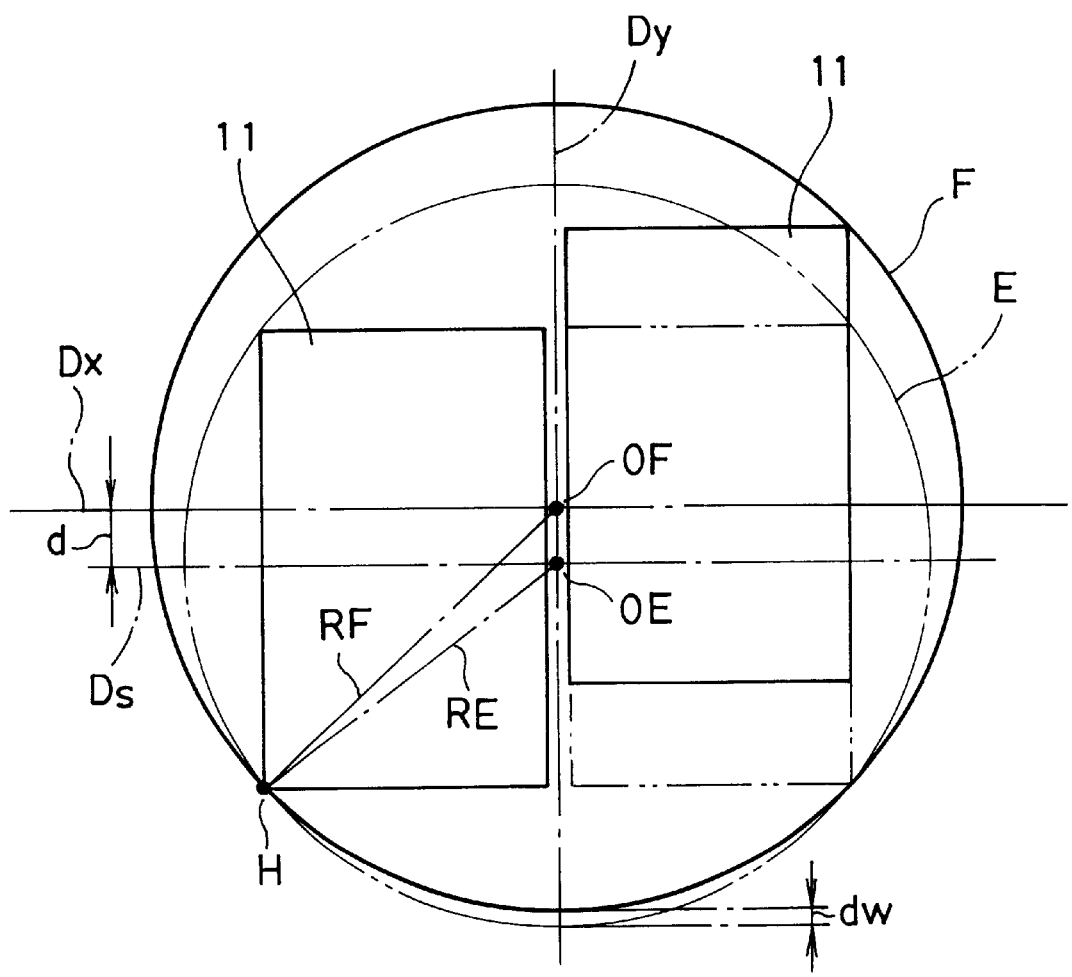
FIG. 15 is a diagram for describing advantages of the cassette changer in FIGS. 11 to 14.

FIG. 15 schematically shows the relationship between the circle F in FIG. 11, which is based on the present invention, and the circle E in FIG. 16, which is not based on the present invention. In this case, a straight line Dy crosses the straight lines Dx and Ds and passes through a point OE that is a central point of the circle E and through a point OF that is a central point of the circle F. The radius of the circle E is a straight line RE joining the point OE with a point H that is a corner of the tape cassette 11, and the radius of the circle F is a straight line RF joining the point OF with the point H. As seen in FIG. 15, the straight line RF is longer than the straight line RE. In addition, the circle E and the circle F cross each other at the point H.

Consequently, at one end side of the straight line Dy, there is an area in which the circle F is partly located inward of the circle E by a distance dw. Thus, if the insertion and withdrawal opening 12 of the recording/reproducing device 10 is eccentric as shown in FIGS. 11 and 12, the rotational trace of the cassettes 11, which is based on the rotation of the turntable 13, can be set to be more inward. As a result, the cassette changer shown in FIGS. 11 and 12 and configured according to the present invention is smaller in the width direction than the cassette changer shown in FIGS. 16 and 17 and not having such a configuration.

At the other end side of the straight line Dy, the circle F is located outside the circle E but opposite to the eccentric direction of the insertion and withdrawal opening 12 of the recording/reproducing device 10. Accordingly, there is an extra space in a casing of the cassette changer, thereby eliminating the need to increase the size of the cassette changer.

Furthermore, according to the present invention, the side walls 51 of the second stocker 17 regulate the depth direction of the tape cassettes 11 stored in the first stocker 16, whereas the side walls 51 of the first stocker 16 regulate the depth direction of the tape cassettes 11 stored in the second stocker 17, as shown in FIGS. 13 and 14. Accordingly, no member needs to be provided between the opposed cassette tapes 11, for regulating the positions of these tape cassettes 11 in the depth direction, thereby enabling the interval between the opposed tape cassettes 11 to be reduced. Consequently, the diameter of the circle F shown in FIGS. 11 and 15 can be reduced.

The above described two configurations and functions based thereon serve to reduce the dimensions of the cassette changer in the width direction.

Figure 18:
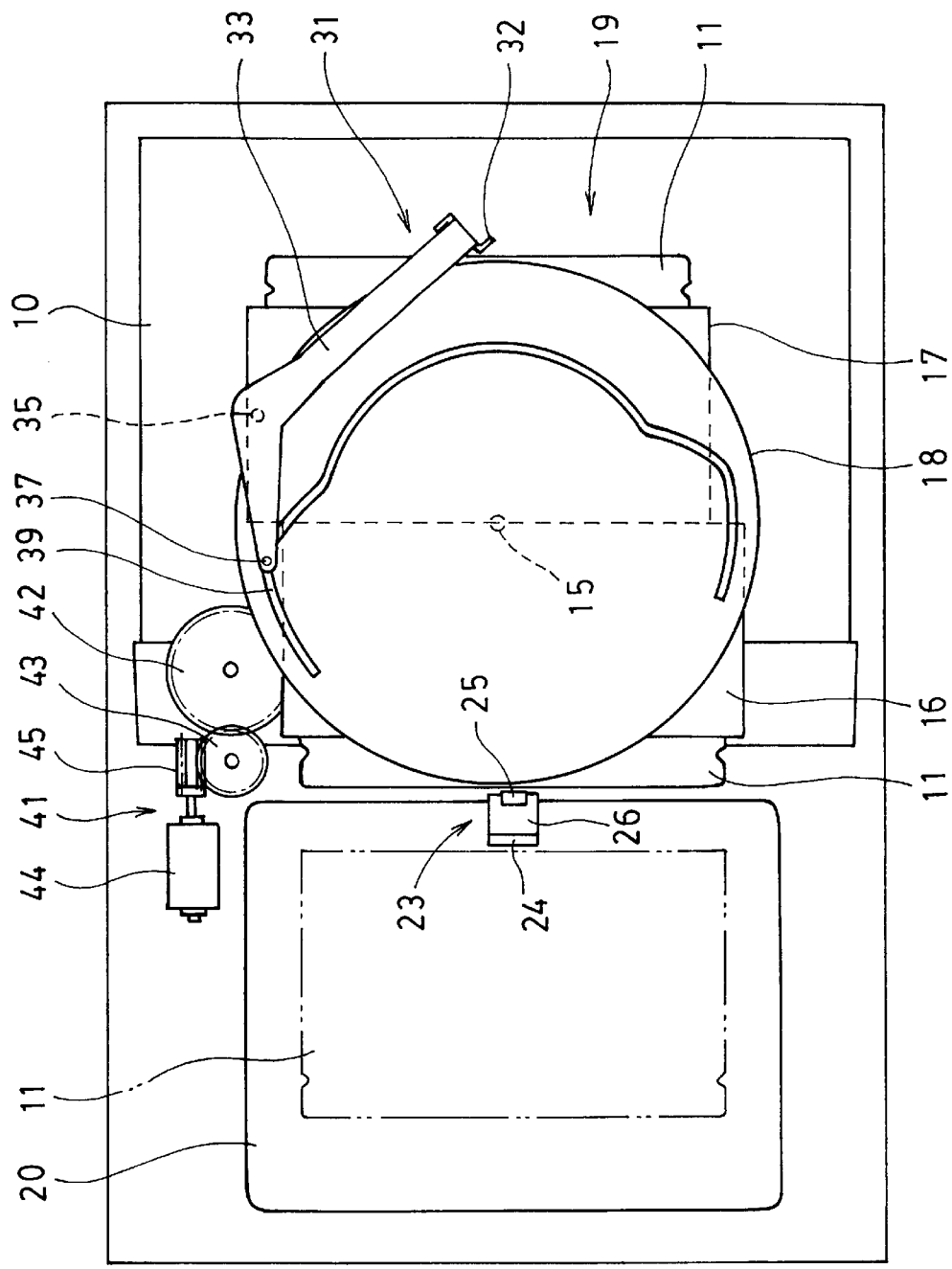
FIG. 18 is a top view showing a configuration in which the push-in member and the cassette presser are provided in the cassette changer in FIGS. 11 to 14.
Figure 19:
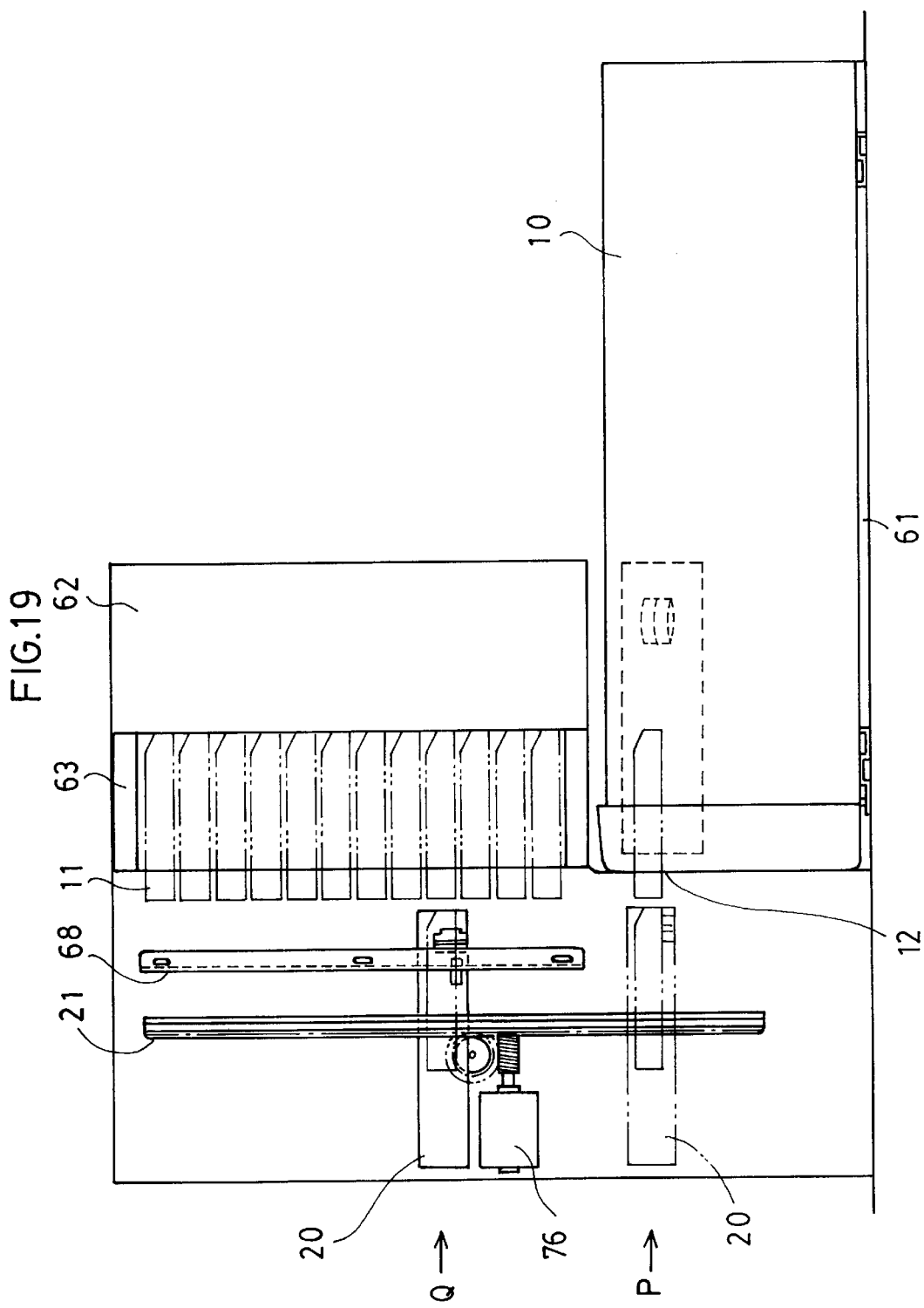
FIG. 19 is a front view showing a general configuration of a cassette changer according to a further embodiment of the present invention.
Figure 20:
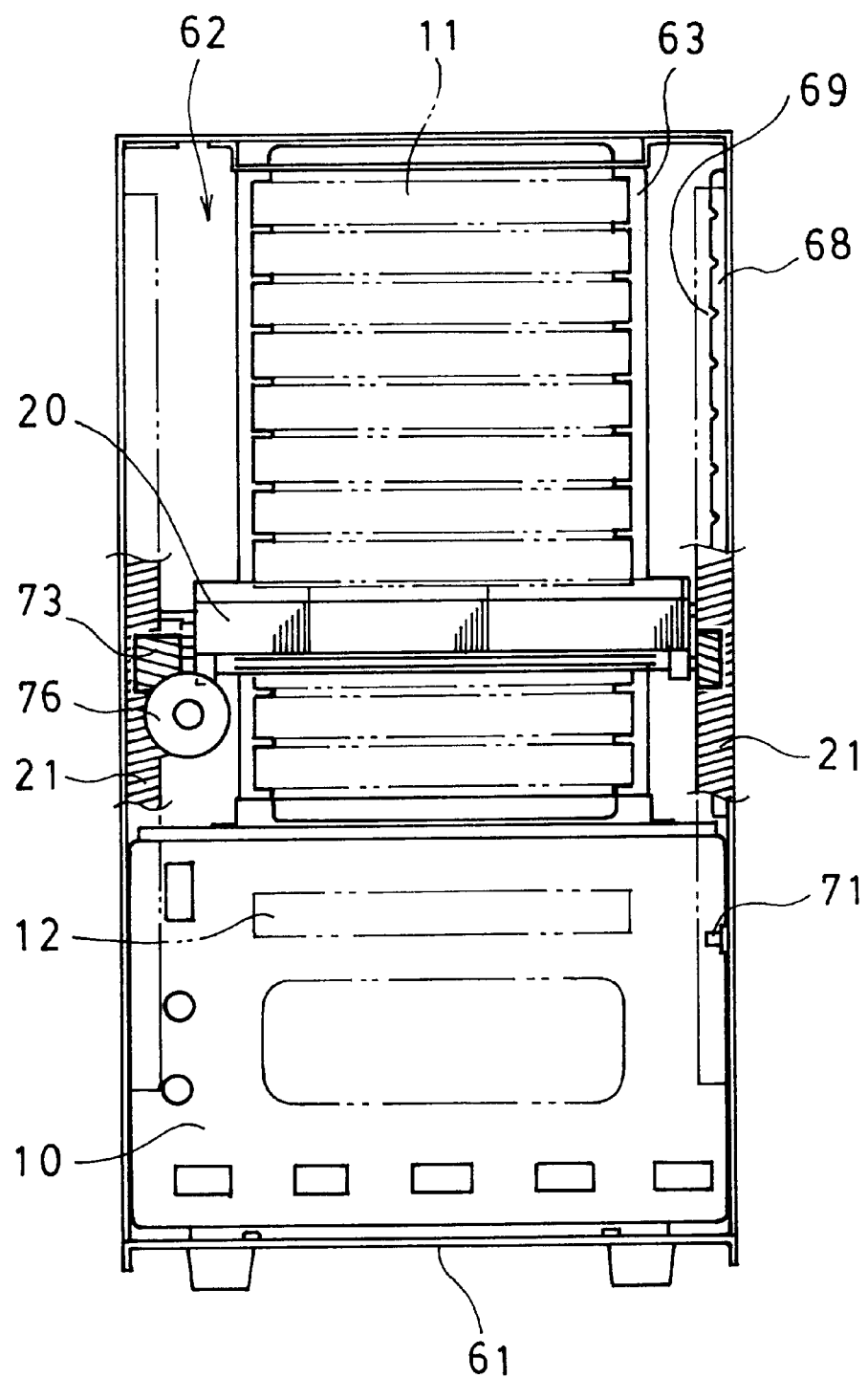
FIG. 20 is a side view of the cassette changer shown in FIG. 19.
Figure 21:
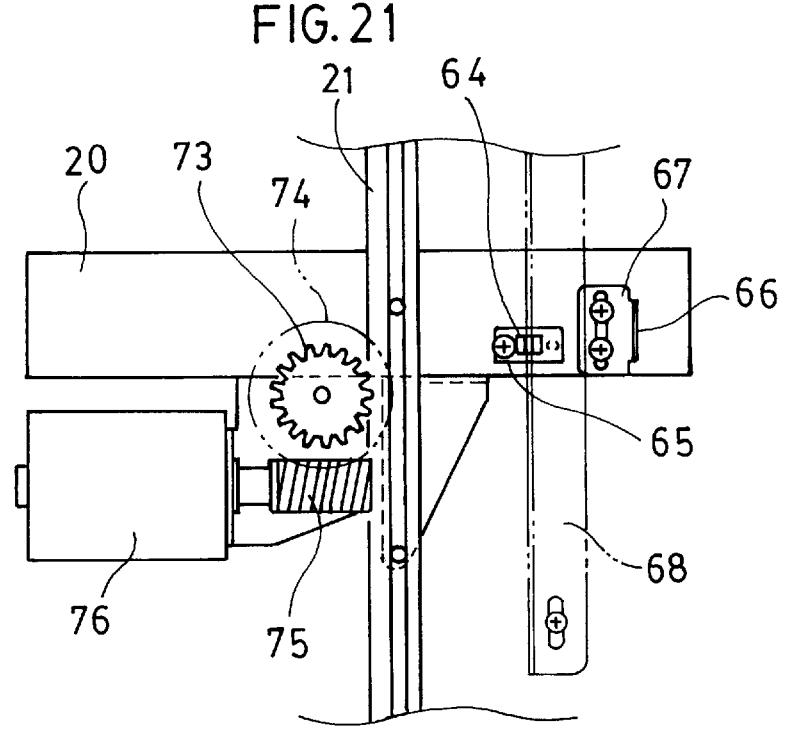
FIG. 21 is a detailed diagram of an essential part of the cassette changer in FIGS. 19 and 20.
Figure 22:
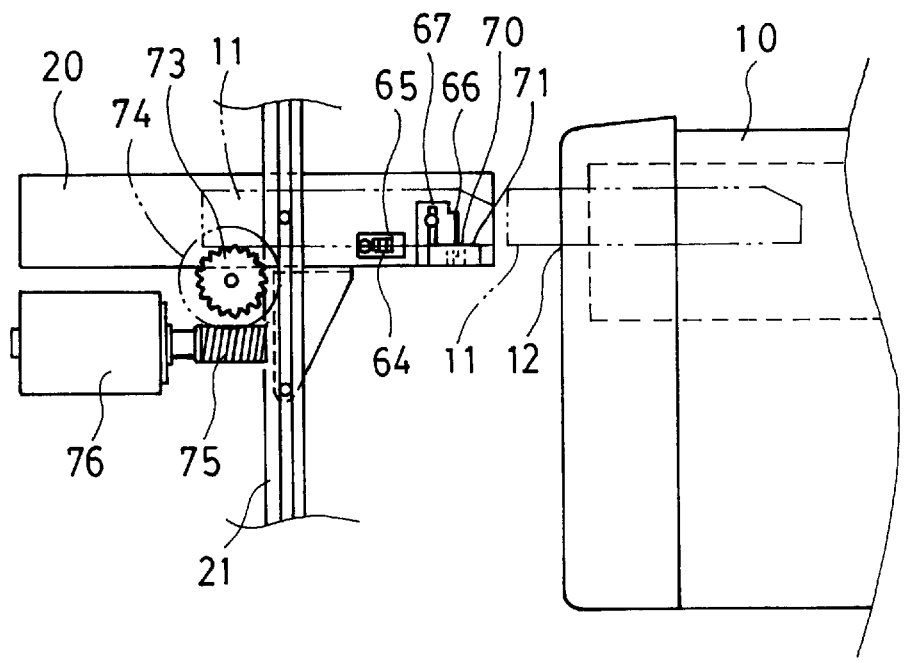
FIG. 22 is a detailed diagram of another essential part of the cassette changer.
Figure 23:
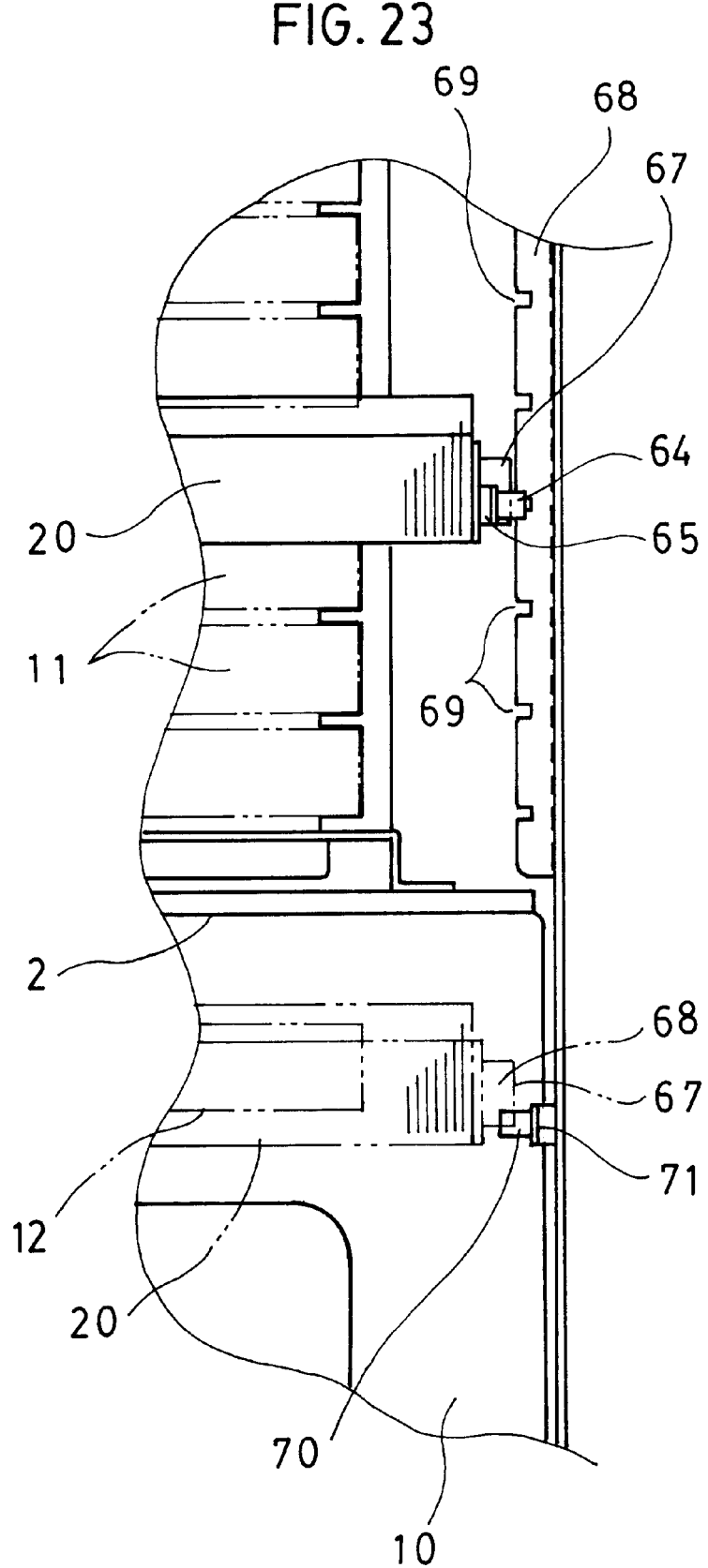
FIG. 23 is a side view showing both parts shown in FIGS. 21 and 22.

FIG. 18 illustrates a cassette changer with the first stocker 16 and the second stocker 17 located on the turntable 13 and offset from each other in the width direction, the cassette changer comprising the push-in member 23 and the cassette presser 31 as in the cassette changer shown in FIGS. 1 to 10.

Next, a cassette changer capable of easily positioning the transfer device 20 based on the present invention will be described with reference to FIGS. 19 to 23.

In the illustrated cassette changer, the recording/reproducing device 10 and a cassette replacement device 62 are replaceably mounted on and above a base 61 at predetermined positions. The cassette replacement device 62 comprises a stocker 63 that stores a plurality of cassettes 11, and the transfer device 20. The stocker 63 is not the pair of rotary stockers arranged on the turntable 13 and shown in FIGS. 1 to 18, but a single fixed stocker. The transfer device 20 elevates and lowers between a first position P corresponding to the insertion and withdrawal opening 12 of the recording/reproducing device 10 and a second position Q corresponding to the stocker 63.

The transfer device 20 comprises an optical sensor 65 including a sensor section 64 and an initial plate 67 including a folded portion 66. The optical sensor 65 outputs different electric signals depending on the presence of an obstacle at the sensor section 64. The initial plate 67 is mounted on the transfer device 20 so that its vertical position can be adjusted using, for example, a slot formed therein and through which mounting screws pass.

The cassette replacement device 62 comprises a counter plate 68 disposed correspondently to the sensor section 64 of the optical sensor 65. The counter plate 68 includes a plurality of slits 69 disposed correspondently to the positions of the cassettes 11 stored in the stocker 63. The cassette replacement device 62 comprises an optical sensor 71 having a sensor section 70. The optical sensor 71 outputs different electric signals depending on the presence of an obstacle at the sensor section 70. The optical sensor 71 is located so that when the transfer device 20 moves downward to the height of the insertion and withdrawal opening 12 of the recording/reproducing device id, the folded portion 66 of the initial plate 67 obstructs the sensor section 70.

Instead of the above described optical sensors 65, 71, other sensors may be used without any functional problem.

The transfer device 20 comprises a pinion 73 meshing with the rack 21, a worm 75 meshing with a worm wheel 74 that rotates integrally with the pinion 73, and a motor 76 for driving the worm 75.

In this configuration, if the transfer device 20, which is located at a position P corresponding to the recording/reproducing device 10, transfers a predetermined cassette in the stocker 63 to the recording/reproducing device 10, the following operations are performed:

First, the motor 76 rotates to move the transfer device 20 in the vertical direction. During the movement of the transfer device 20, the sensor section 64 of the optical sensor 65 moves along the counter plate 68 to measure the slits 69 formed in the counter plate 68. Based on a result of the measurement, the transfer device 20 stops at a height corresponding to the specified cassette 11.

Next, the transfer device 20 withdraws the cassette 11 from the stocker 63, holds it, and then moves downward while holding it. The transfer device 20 stops when the initial plate 67 obstructs the sensor section 70 of the optical sensor 71. At this point, the height of the cassette 11 equals that of the insertion and withdrawal opening 12 of the recording/reproducing device 10. Next, the transfer device 20 carries the held cassette 11 to the insertion and withdrawal opening 12 of the recording/reproducing device 10 for installation.

Next, operations on which the present invention is significantly effective will be described. To assemble the entire cassette changer, the recording/reproducing device 10 and the cassette replacement device 62 are positioned and fixed to the base 1. At this point, for example, jigs are used for the fixation so that a predetermined locational relationship is established between the insertion and withdrawal opening 12 of the recording/reproducing device 10 and the transfer device 20 of the cassette transfer device 62.

Next, replacement of the recording/reproducing device 10 due to a failure or the like will be described. In this case, the recording/reproducing device 10 may be replaced with one with the insertion and withdrawal opening 12 located at a different height. In such a case, by regulating the initial plate 67 in a height direction of the cassette changer, the transfer device 20 is reliably stopped at the height of the insertion and withdrawal opening 12 of the new recording/reproducing device 10.

What is claimed is:

1. A cassette changer comprising:
    a stocker for storing a plurality of cassettes along a vertical direction of the cassette changer;
    a recording/reproducing device for recording signals in a cassette or reproducing signals from a cassette;
    a transfer device for transferring a cassette between said stocker and said recording/reproducing device; and
    a push-in member located in the transfer device for operating in response to movement of the transfer device in the vertical direction along a plurality of cassettes stored in said stocker, to push in one of a plurality of cassettes that projects from the stocker, to a position where the formerly projecting cassette does not disturb the movement of the transfer device in the stocker.

2. A cassette changer according to claim 1, wherein said push-in member comprises a cam integrated with the transfer device.

3. A cassette changer according to claim 2, wherein said cam has an inclined cam surface in relation to a moving direction of the transfer device.

4. A cassette changer according to claim 1, wherein said push-in member comprises an elastic roller for pushing-in the cassette.

5. A cassette changer according to claim 3, comprising an elastic roller for pushing in a cassette, the elastic roller further projecting from a tip portion of the cam surface toward the stocker side.

6. A cassette changer comprising:
    a recording/reproducing device for recording signals in a cassette or reproducing signals from a cassette;
    a turntable;
    stockers for rotating integrally with the turntable, each of the stockers for housing a plurality of cassettes;
    a transfer device for moving a cassette between the recording/reproducing device and the stocker located at a predetermined position by means of rotation of the turntable; and
    cassette projection-preventing means for pivotable movement relative to the turntable, located for not disturbing rotation of the stocker when the stocker storing cassettes is rotating with the turntable, and located for preventing cassettes stored in the stocker from projecting from the stocker when the stocker has stopped.

7. A cassette changer according to claim 6, wherein said cassette projection-preventing means uses rotative motion of the turntable as a power source to move between a position that does not disturb rotation of cassettes stored in the stocker and a position for preventing cassettes from projecting.

8. A cassette changer according to claim 7, wherein said cassette projection-preventing means comprises a presser section for pushing cassettes stored in the stocker, an arm for pivoting integrally with the presser section, a cam follower pin located on the arm, and a cam groove for rotating the cam follower pin and for rotating integrally with the turntable.

9. A cassette changer comprising:
    a recording/reproducing device for recording signals in a cassette or reproducing signals from a cassette;
    a turntable;
    a first stocker and a second stocker for rotating integrally with the turntable, each of the stockers for laminating and storing a plurality of cassettes of a predetermined width in their thickness direction such that the thickness direction aligns with a direction of a rotating axis of the stocker, and the first stocker and the second stocker being arranged symmetrically with respect to their rotating center and offset from each other in a length direction of cassettes; and
    a transfer device for transferring a cassette between one of the stockers located at a predetermined position by means of rotation of the turntable and the recording/reproducing device.

10. A cassette changer according to claim 9, wherein the first stocker and the second stocker each have side walls for regulating a length direction of cassettes, and the side walls of one of the stockers are located to regulate a depth direction of cassettes stored in the other stocker.

11. A cassette changer comprising:
    a stocker for storing a plurality of cassettes;
    a recording/reproducing device having an insertion and withdrawal opening through which a cassette can be inserted and withdrawn, for recording signals in a cassette or reproducing signals from a cassette; and
    a transfer device for transferring cassettes between said stocker and said insertion and withdrawal opening of the recording/reproducing device;
    said stocker being capable of laminating and storing a plurality of cassettes in a transfer direction of said transfer device;

said cassette changer further comprising:
  sensor means;
    a first detected member that is detected by said sensor means when the transfer device is located correspondently to cassettes stored in the stocker; and
    a second detected member that is detected by said sensor means when the transfer device is located correspondently to the insertion and withdrawal opening of the recording/reproducing device, the second detected member for having its position adjusted along a moving direction of said transfer device.

12. A cassette changer according to claim 11, wherein said sensor means comprises a first sensor for detecting the first detected member and a second sensor for detecting the second detected member, and said second detected member is for adjusting a position along a moving direction of the transfer device.

* * * * *